Patented Mar. 14, 1933

1,901,506

UNITED STATES PATENT OFFICE

FRITZ GÜNTHER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

WETTING AGENT

No Drawing. Application filed August 10, 1925, Serial No. 49,447, and in Germany July 11, 1924. Renewed July 29, 1932.

An application for patent has been filed in Germany on July 11th, 1924.

I have found that sulfonic acids of aromatic hydrocarbons or their salts which are substituted by butyl groups have very strikingly the valuable properties of soap, especially on account of giving lather and emulsions of oil and other substances and generally of furthering the wetting of materials of any kind with water or aqueous liquids. As examples of sulphonic acids suitable for the purpose of the present invention I mention sulfonated and butylated benzene, toluene or other homologues of benzene, or naphthalene or its homologues or anthracene or the like, containing both sulfonic acid and butyl groups. The butyl group or groups may be normal- or iso- or tertiary-butyl groups and the sulfonic acids of hydrocarbons containing such groups can be obtained by acting with iso-butyl alcohol or with one of the isomeric alcohols or with mixtures containing several butyl alcohols on aromatic hydrocarbons or their sulfonic acids in the presence of sulfuric acid and in the first case sulfonating either at the same time or after the introduction of the butyl groups has taken place.

For example 128 parts of naphthalene are converted into beta-naphthalene sulfonic acid by heating with 128 parts of sulfuric acid of 67 degrees Baumé to about 150 degrees centigrade for 5 hours. The mass is cooled to 120 degrees centigrade, mixed with 100 parts of sulfuric acid of 67 degrees Baumé and further cooled to from 80 degrees to 85 degrees centigrade. While maintaining the mixture of the sulfonic acid and sulfuric acid at this temperature, a mixture of 200 parts of ordinary commercial concentrated sulfuric acid of 66 degrees Baumé and 222 parts of iso-butyl alcohol is allowed to run into the sulfonic acid mixture in the course of 2 hours while vigorously stirring. When all of this mixture has run in, the temperature of the mixture is raised to about 100 degrees centigrade at which temperature the reaction is completed in the course of a few additional hours. Thereupon the mass is poured into water and separated from any oil, neutralized with lime, filtered and the filtrate is incorporated with sodium carbonate in the usual manner, whereby the calcium salts of the polybutylated naphthalene sulphonic acids are converted into sodium salts whereas calcium carbonate is precipitated. The insoluble calcium carbonate is removed by filtration from the aqueous solution of the mixture of sodium salts of tri-butylnaphthalene sulphonic acid and of some di-butyl-naphthalene sulphonic acid. By evaporating, the butylated naphthalene sulfonic acid sodium salt is obtained in the form of a slightly yellowish powder. When normal butyl alcohol is used the mass directly forms two layers, the upper layer of which represents chiefly the free butylated naphthalene sulfonic acid.

The said sulfonic acids which may also be employed in the form of their salts are of special value as they are not decomposed by acid or calcareous water in which cases soap cannot be used. As examples of suitable application I mention the preparation of solutions or emulsions of fats and oils, hydrocarbons or derivatives thereof, chloroform and similar liquors with sulfonic acids or their salts or aqueous solutions thereof, or the use of the said substances for washing and cleansing purposes, for liquors for milling wool or for baths for dyeing in the lather, but I do not wish to limit myself in any way to the above applications, as the said sulfonic acids can be used for any purpose for which it is desirable to make use of soap, whether for wetting or emulsifying or cleansing. The said compositions are equivalents for the purpose of the present invention and are hereinafter referred to as substances of high wetting power.

The following are specific examples of compositions according to the present invention, though it is understood that our invention is not limited thereto.

(a) 5 parts of the sodium salt of a butylated naphthalene sulfonic acid are dissolved in 1000 parts of water.

(b) 25 parts of a butylated naphthalene sulfonic acid are mixed with 10 parts of butyl alcohol and 65 parts of water. The product may be mixed with water in any desired proportion without the alcohol separating out.

The expression "sulfonic acid compounds", as used in the claims, is intended to include the free sulfonic acids and the water-soluble salts of such acids.

I claim:

1. As a composition of matter suitable for use as a wetting agent a mixture comprising an organic liquid practically insoluble in water and a sulfonated aromatic hydrocarbon containing more than one butyl radical and an aqueous liquid.

2. As a composition of matter suitable for use as a wetting agent a mixture comprising an organic liquid practically insoluble in water and a naphthalene sulfonic acid containing more than one butyl radical.

3. The process of preparing liquids of high wetting power which comprises adding a sulfonated aromatic hydrocarbon, containing more than one butyl radicle, to an aqueous liquid.

4. As a new composition, suitable for use as a wetting agent, a mixture comprising an organic liquid practically insoluble in water and an alkylated naphthalene sulphonic acid compound, selected from the group consisting of di-butyl-naphthalene sulphonic acid compounds and tri-butylnaphthalene sulphonic acid compounds.

5. As a new composition, suitable for use as a wetting agent, a mixture comprising an organic liquid practically insoluble in water and a mixture of a di-butylnaphthalene sulphonic acid compound with a tri-butylnaphthalene sulphonic acid compound.

In testimony whereof I have hereunto set my hand.

FRITZ GÜNTHER.